United States Patent
Panda et al.

(10) Patent No.: US 10,270,692 B1
(45) Date of Patent: Apr. 23, 2019

(54) ESTABLISHING A CONNECTION TO MULTIPLE NETWORK DEVICES USING A SINGLE INTERNET PROTOCOL (IP) ADDRESS

(71) Applicant: Juniper Networks, Inc., Sunnyvale, CA (US)

(72) Inventors: Pravas Kumar Panda, Bangalore (IN); Deepansh Agrawal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 154 days.

(21) Appl. No.: 15/348,558

(22) Filed: Nov. 10, 2016

(51) Int. Cl.
*H04L 12/741* (2013.01)
*H04L 29/08* (2006.01)

(52) U.S. Cl.
CPC ............ *H04L 45/74* (2013.01); *H04L 67/141* (2013.01)

(58) Field of Classification Search
CPC .............................. H04L 45/74; H04L 67/141
See application file for complete search history.

(56) References Cited

U.S. PATENT DOCUMENTS

| | | | | |
|---|---|---|---|---|
| 7,346,909 B1 * | 3/2008 | Eldar | ............... | H04L 29/12924 709/202 |
| 7,870,153 B2 * | 1/2011 | Croft | .................... | G06F 3/1415 707/694 |
| 8,428,087 B1 * | 4/2013 | Vincent | .................. | H04L 69/22 370/474 |
| 8,739,257 B1 * | 5/2014 | Robinson | ................ | G06F 21/44 713/168 |
| 9,110,732 B1 * | 8/2015 | Forschmiedt | ....... | G06F 9/44505 |
| 9,112,769 B1 * | 8/2015 | Fitzgerald | ........... | H04L 41/0213 |
| 9,306,837 B1 * | 4/2016 | Jain | ......................... | H04L 45/16 |
| 9,590,911 B2 * | 3/2017 | Visser | | |
| 9,698,988 B2 * | 7/2017 | Ye | .......................... | H04L 9/321 |
| 9,755,965 B1 * | 9/2017 | Yadav | .................... | H04L 45/54 |
| 9,787,657 B2 * | 10/2017 | Kottahachchi | .......... | H04L 63/08 |
| 9,807,129 B2 * | 10/2017 | Fries | .................. | H04L 65/1069 |
| 9,882,957 B1 * | 1/2018 | Mostert | ................... | H04L 67/02 |

(Continued)

OTHER PUBLICATIONS

Wikipedia, "Secure Shell," https://en.wikipedia.org/wiki/Secure_Shell, Oct. 24, 2016, 9 pages.

(Continued)

*Primary Examiner* — Tejis Daya
(74) *Attorney, Agent, or Firm* — Harrity & Harrity, LLP

(57) ABSTRACT

A device may receive a request to establish a connection to a network device or one or more other network devices. The request may include a destination identifier that identifies a destination to which the request is to be provided. The one or more other network devices may be associated with a same Internet protocol (IP) address as the network device. The device may determine, from the destination identifier, a device identifier that identifies the network device or another network device as the destination to which the request is to be provided. The device may determine whether the device identifier matches a set of stored device identifiers. The device may provide the request to the network device or the other network device based on determining that the device identifier matches the set of stored device identifiers. The device may perform an action related to the request or the connection.

20 Claims, 5 Drawing Sheets

(56) References Cited

U.S. PATENT DOCUMENTS

| | | | |
|---|---|---|---|
| 2012/0063458 A1* | 3/2012 | Klink | H04L 29/12367 370/392 |
| 2012/0096271 A1* | 4/2012 | Ramarathinam | H04L 63/0807 713/172 |
| 2012/0290643 A1* | 11/2012 | Fok Ah Chuen | H04W 4/02 709/203 |
| 2015/0256341 A1* | 9/2015 | Ye | H04L 41/0803 713/164 |
| 2016/0248818 A1* | 8/2016 | Fries | H04L 67/2861 |
| 2017/0180274 A1* | 6/2017 | Liu | H04L 49/70 |

OTHER PUBLICATIONS

Wikipedia, "IP address," https://en.wikipedia.org/wiki/IP_address, Oct. 30, 2016, 9 pages.

\* cited by examiner

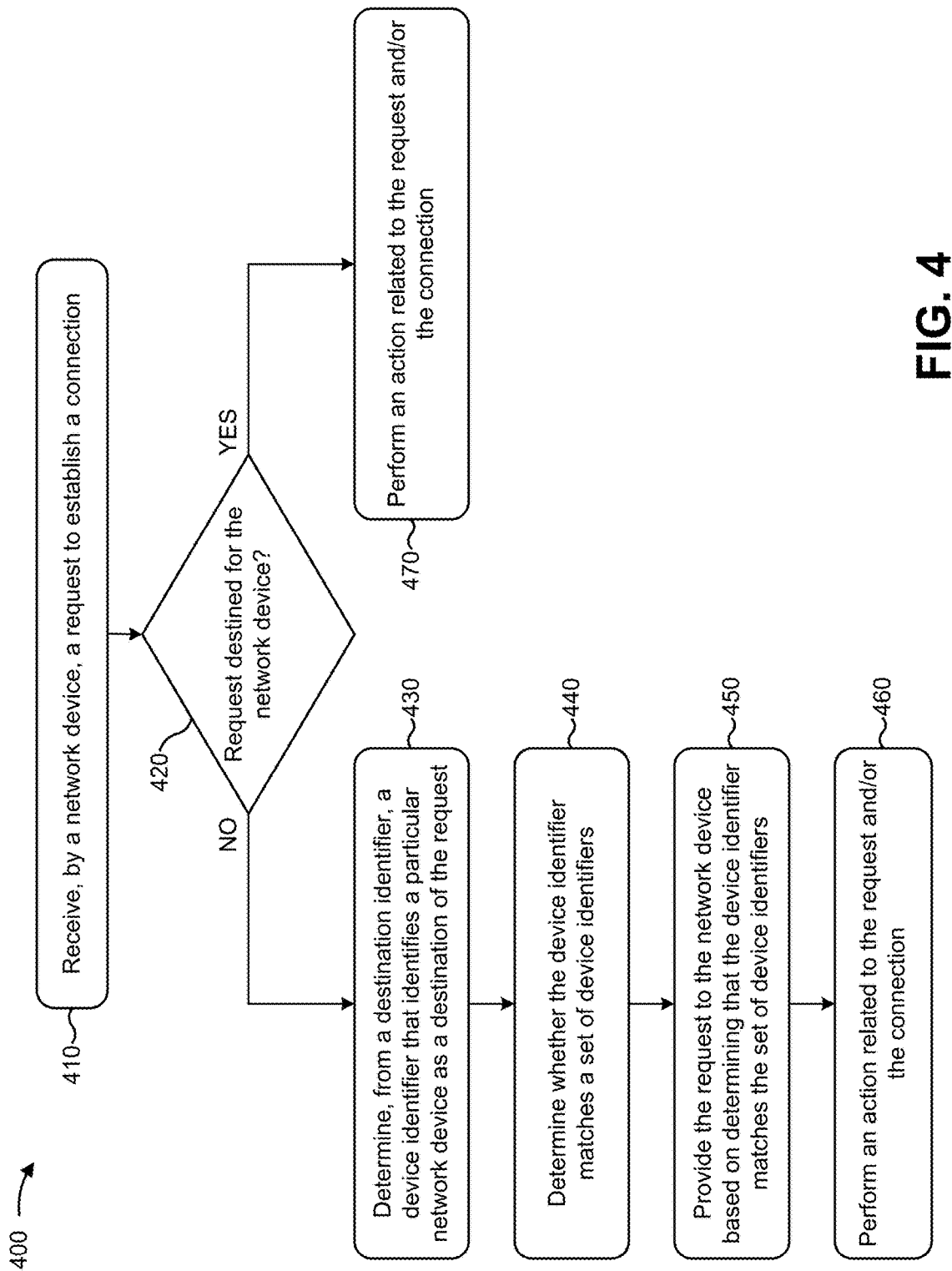

ESTABLISHING A CONNECTION TO MULTIPLE NETWORK DEVICES USING A SINGLE INTERNET PROTOCOL (IP) ADDRESS

BACKGROUND

An Internet Protocol address (IP address) is a numerical label assigned to a device (e.g., computer, printer, mobile device, etc.) participating in a computer network that uses the Internet Protocol for communication. An IP address serves two principal functions: host or network interface identification and location addressing. An IP address indicates a network location for a device. An IP address may be a 32-bit number (e.g., as in Internet protocol version four (IPv4)). Alternatively, an IP address may be a 128-bit number (e.g., as in Internet protocol version six (IPv6)).

SUMMARY

According to some possible implementations, a device may include one or more processors to receive a request to establish a connection. The request may be destined for the device or a virtual device of a plurality of virtual devices implemented on the device. The device and the plurality of virtual devices may be associated with a single Internet protocol (IP) address. The request may include a destination identifier used to provide the request to a destination. The one or more processors may determine, from the destination identifier, a device identifier that identifies the virtual device as the destination of the request. The one or more processors may determine whether the device identifier matches a set of device identifiers stored by the device to verify the device identifier. The one or more processors may provide the request to the virtual device based on verifying the device identifier. The one or more processors may perform an action related to the request or the connection based on providing the request to the virtual device.

According to some possible implementations, a non-transitory computer-readable medium may store instructions that, when executed by one or more processors, cause the one or more processors to receive a request to establish a connection to a network device or one or more other network devices. The request may include a destination identifier that identifies a destination to which the request is to be provided. The one or more other network devices may be associated with a same Internet protocol (IP) address as the network device. The one or more instructions, when executed by the one or more processors, may cause the one or more processors to determine, from the destination identifier, a device identifier that identifies the network device or another network device of the one or more other network devices as the destination to which the request is to be provided based on receiving the request. The one or more instructions, when executed by the one or more processors, may cause the one or more processors to determine whether the device identifier matches a set of stored device identifiers. The set of stored device identifiers may identify a set of verified network devices. The one or more instructions, when executed by the one or more processors, may cause the one or more processors to provide the request to the network device or the other network device based on determining that the device identifier matches the set of stored device identifiers. The one or more instructions, when executed by the one or more processors, may cause the one or more processors to perform an action related to the request or the connection based on providing the request to the network device or the other network device.

According to some possible implementations, a method may include receiving, by a device, a request to establish a connection to the device or a virtual device of a plurality of virtual devices implemented on the device. The request may include a destination identifier used to provide the request to the device or the virtual device. The device and the plurality of virtual devices may be associated with a same Internet protocol (IP) address. The method may include determining, by the device and from the destination identifier, a device identifier that identifies the virtual device based on receiving the request. The method may include performing, by the device, a comparison of the device identifier and a set of device identifiers to verify the device identifier based on determining the device identifier. The method may include providing, by the device, the request to the virtual device based on verifying the device identifier. The method may include performing, by the device, an action related to the request or the connection based on providing the request to the virtual device.

BRIEF DESCRIPTION OF THE DRAWINGS

FIG. 4 is a flow chart of an example process for establishing a connection to multiple network devices using a single IP address.

DETAILED DESCRIPTION

The following detailed description of example implementations refers to the accompanying drawings. The same reference numbers in different drawings may identify the same or similar elements.

A network device (e.g., a physical network device or a virtual network device) may have an Internet protocol (IP) address that provides external access to the network device (e.g., to a network administrator for management purposes). In some cases, each network device may have an assigned IP address. Thus, a network may use hundreds or thousands of IP addresses, such as when a network includes hundreds or thousands of network devices. In some cases, the quantity of IP addresses available may be limited.

Implementations, described herein, may enable the use of a single IP address to provide external access to multiple network devices. As such, the implementations described herein, reduce or eliminate the need to have a different IP address for each network device. Further, the quantity of IP addresses used to provide access to multiple network devices may be reduced. For example, multiple network devices may be virtualized on a single physical network device such that the multiple network devices are accessible via a single IP address associated with the physical network device. This conserves processing resources by reducing a quantity of lookups that a device has to perform to identify an IP address of a network device and by enabling the device to quickly and efficiently identify the IP address. In addition, this conserves memory resources by reducing a quantity of IP addresses that a device stores. Further, this increases an efficiency of connecting to multiple network devices by permitting a device to connect to the multiple network devices using a single IP address rather than multiple IP addresses.

Figure 1A:
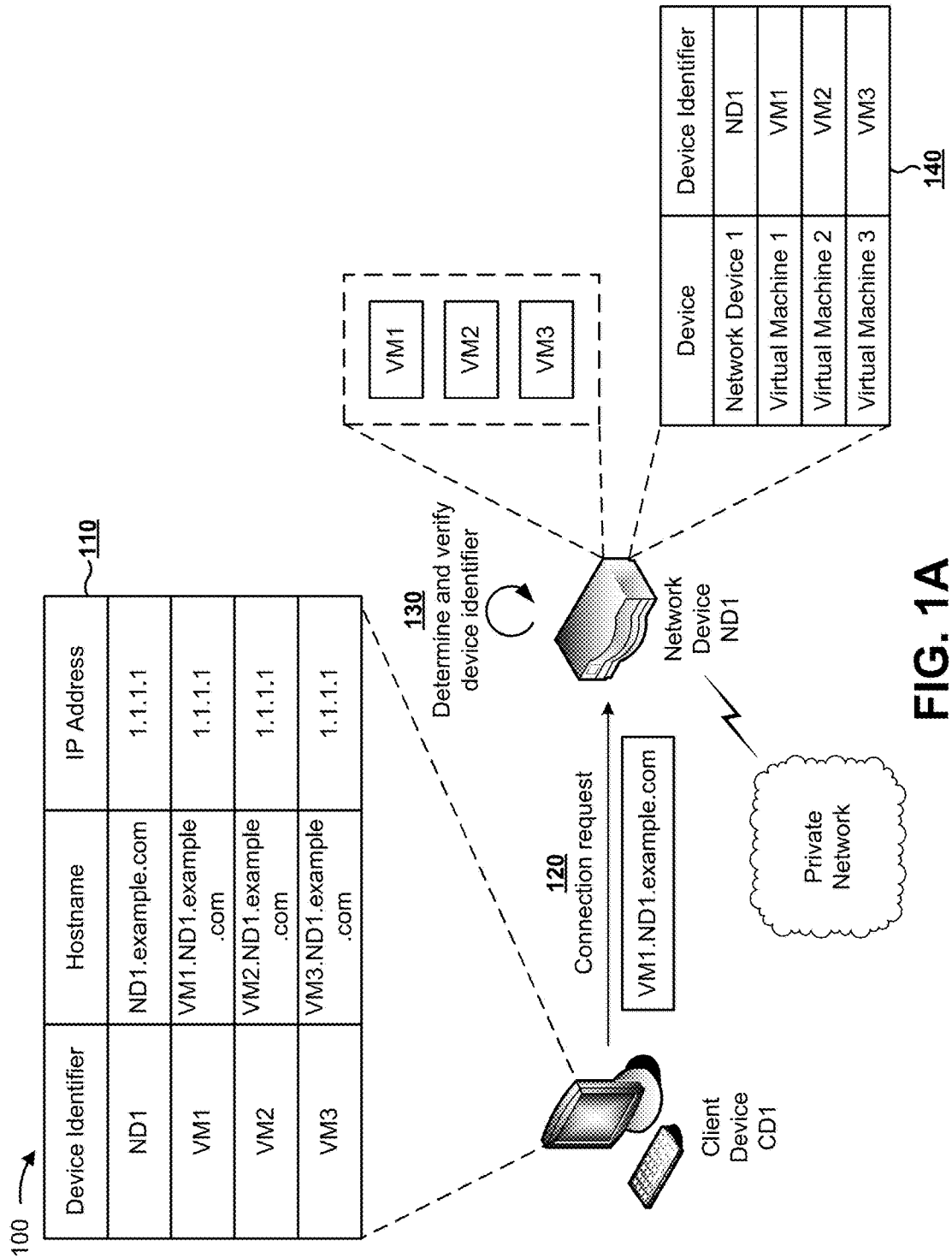
FIGS. 1A and 1B are diagrams of an overview of an example implementation described herein.
Figure 1B:
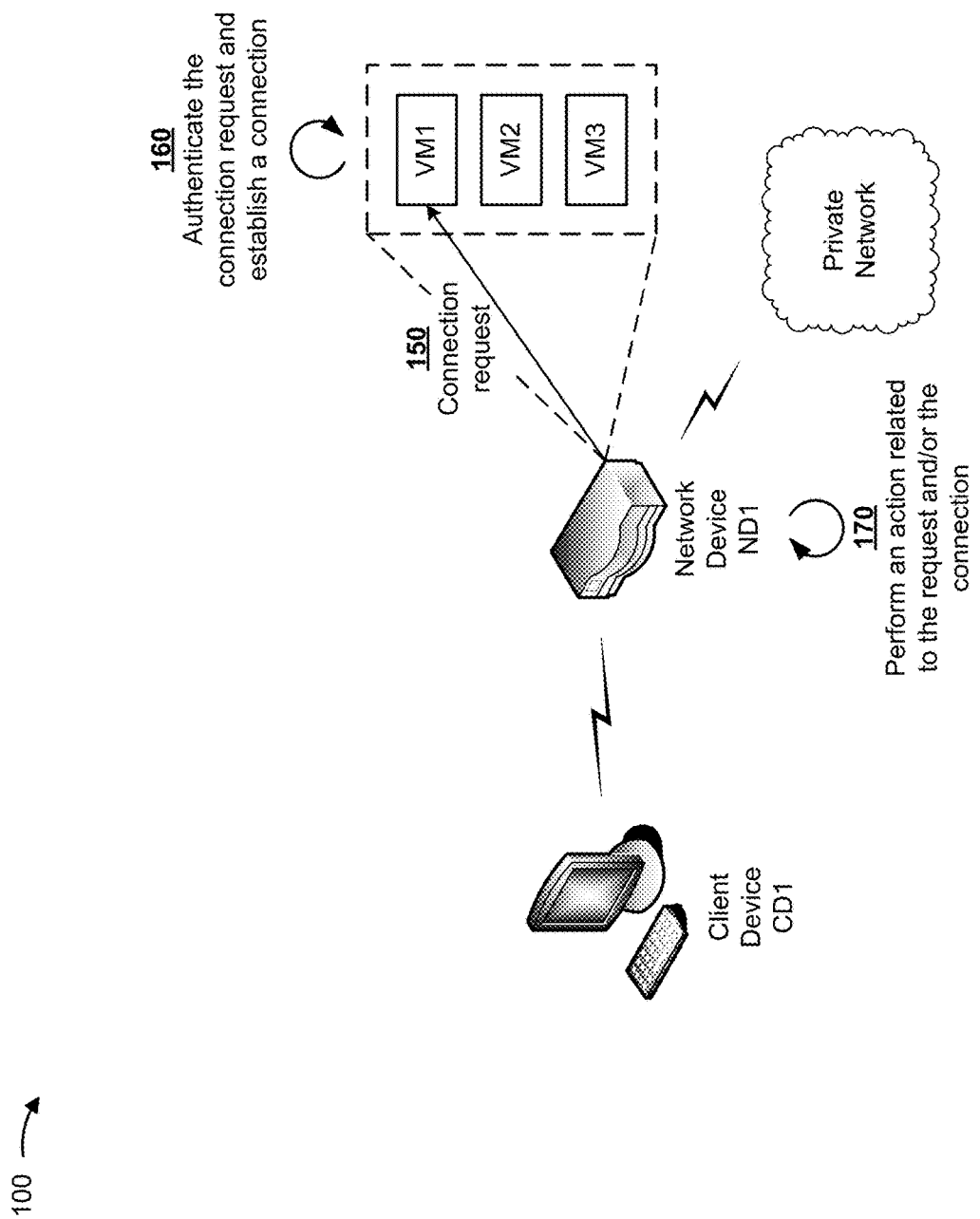

FIGS. 1A and 1B are diagrams of an overview of an example implementation 100 described herein. As shown by reference number 110 in FIG. 1A, a client device CD1 may store information regarding network devices associated with a network device ND1. As shown by reference number 110, network device ND1 and various related virtual machines (representing other network devices different from network device ND1) may share the same publically accessible IP address (e.g., the IP address 1.1.1.1).

As shown by reference number 120, network device ND1 may receive a connection request (e.g., from client device CD1). The connection request may include a hostname (e.g., the hostname "VM1.ND1.example.com"). Based on receiving the connection request, as shown by reference number 130, network device ND1 may determine and verify a device identifier, included in the hostname, to identify the network device to which client device CD1 is attempting to connect. For example, network device ND1 may determine the device identifier VM1 from the hostname and verify the device identifier based on the determined device identifier and based on a stored data structure mapping the device identifier to a network device (as shown by reference number 140). In some implementations, network device ND1 may verify the device identifier to ensure that the device identifier included in the hostname identifies a known/registered network device.

As shown in FIG. 1B, and by reference number 150, network device ND1 may forward the request to the appropriate network device identified based on determining and verifying the device identifier (e.g., device identifier VM1 in this case). As shown by reference number 160, the network device may authenticate the request and establish a connection with client device CD1 (e.g., via network device ND1). As shown by reference number 170, network device ND1 may perform an action related to the request and/or the connection. For example, network device ND1 may receive traffic from and/or send traffic to client device CD1 and/or virtual machine VM1.

In this way, the use of a single IP address may be used for access to multiple network devices. As such, the need to have a different IP address for each network device may be reduced and/or eliminated. This conserves processing resources by reducing a quantity of lookups that a device may perform when connecting to different network devices and by increasing an efficiency of connecting to multiple network devices. Further, the quantity of IP addresses used to access multiple network devices may be reduced. This conserves memory resources by reducing a quantity of IP addresses that a device may store for multiple network devices.

As indicated above, FIGS. 1A and 1B are provided merely as an example. Other examples are possible and may differ from what was described with regard to FIGS. 1A and 1B.

Figure 2:
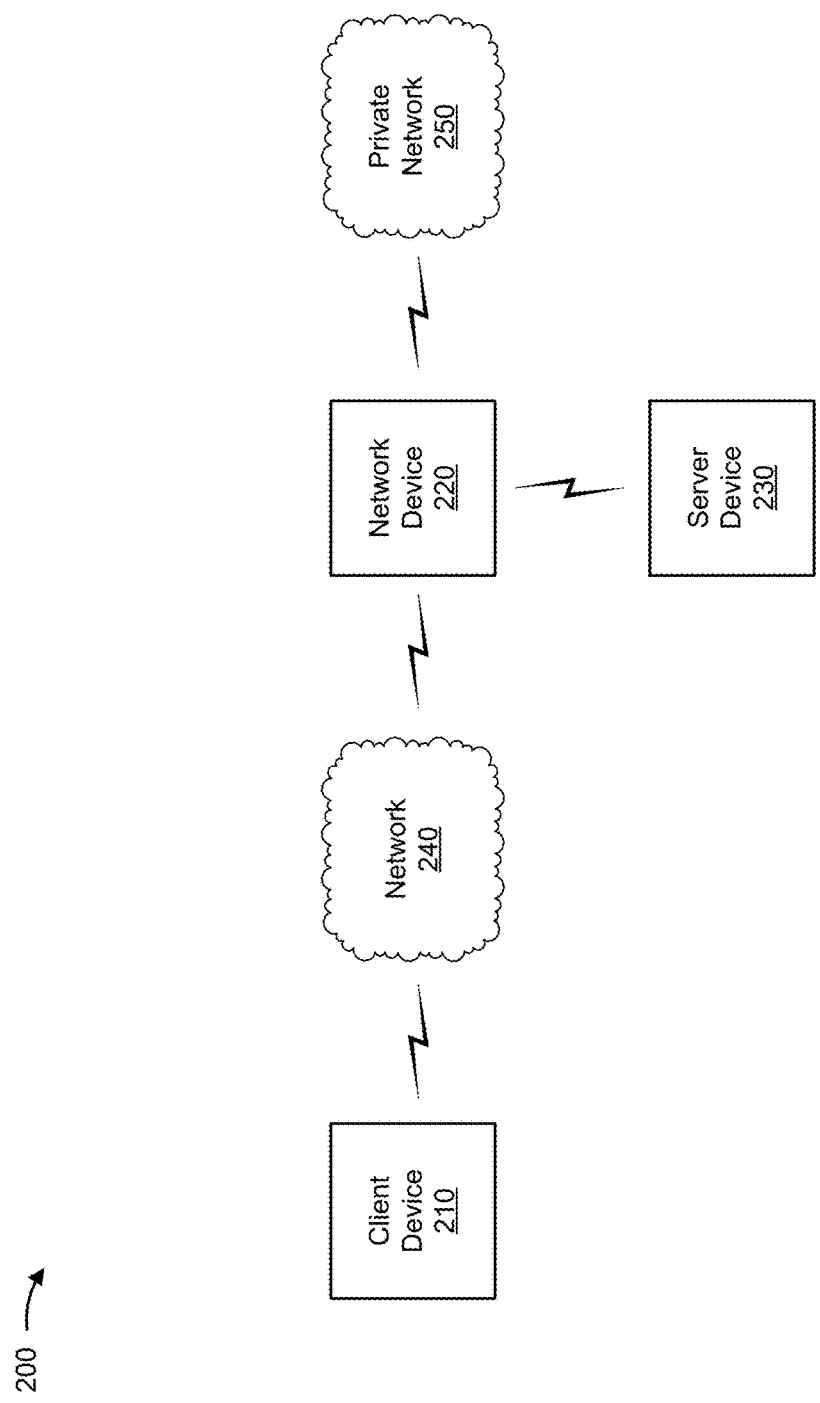
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network device 220, a server device 230, a network 240, and a private network 250. Devices of environment 200 may interconnect via wired connections, wireless connections, or a combination of wired and wireless connections.

Client device 210 includes one or more devices capable of receiving, generating, storing, processing, and/or providing information associated with connecting to a network device 220, a virtual network device implemented on network device 220, and/or another network device. For example, client device 210 may include a communication and/or computing device, such as a mobile phone (e.g., a smart phone or a radiotelephone), a desktop computer, a laptop computer, a tablet computer, a gaming device, a wearable communication device (e.g., a smart wristwatch, a pair of smart eyeglasses, or an activity band), or a similar type of device. In some implementations, client device 210 may send a connection request to network device 220 (e.g., based on input from a user of client device 210), as described elsewhere herein. Additionally, or alternatively, client device 210 may communicate with network device 220 and/or another network device based on establishing a connection, as described elsewhere herein.

Network device 220 includes one or more devices (e.g., one or more traffic transfer devices) capable of receiving, storing, generating, processing, and/or providing information, such as information related to a request to establish a connection. For example, network device 220 may include a router, a gateway, a switch, a hub, a bridge, a firewall, a reverse proxy, a server (e.g., a proxy server), a security device, an intrusion detection device, a load balancer, or a similar type of device. In some implementations, network device 220 may include a hypervisor, one or more software implementations of a machine (e.g., one or more virtual machines (VMs)), and/or one or more software implementations of a network function (e.g., one or more virtual network functions (VNFs)). Additionally, or alternatively, network device 220 may be connected to one or more other network devices (e.g., one or more VMs, VNFs, or network devices 220). In some implementations, network device 220 may receive, from client device 210, a request to connect to network device 220 or another network device, as described elsewhere herein. Additionally, or alternatively, network device 220 may process the request, as described elsewhere herein.

Server device 230 includes one or more devices capable of receiving, generating, storing, processing, and/or providing information associated with a request to connect to network device 220 and/or another network device. For example, server device 230 may include a server (e.g., in a data center or a cloud computing environment), a data center (e.g., a multi-server micro data center), a workstation computer, a VM provided in a cloud computing environment, a domain name server that translates a text based or human-readable identifier to a system/network identifier or address (e.g., an IP address), or a similar type of device. In some implementations, server device 230 may include a communication interface that allows server device 230 to receive information from and/or transmit information to other devices in environment 200. In some implementations, server device 230 may store domain names and/or hostnames for network devices and corresponding IP addresses for the network devices, as described elsewhere herein. Additionally, or alternatively, server device 230 may receive a domain name and/or a hostname and may translate the domain name or the hostname into an IP address, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Private network 250 includes one or more wired and/or wireless networks. For example, private network 250 may include a private network, a cellular network (e.g., an LTE network, a CDMA network, a 3G network, a 4G network, a 5G network, another type of advanced generation network, etc.), a PLMN, a LAN, a WAN, a MAN, a telephone network (e.g., the PSTN), an ad hoc network, an intranet, the Internet, a fiber optic-based network, a cloud computing network, or the like, and/or a combination of these or other types of networks. In some implementations, a device external to private network 250 (e.g., client device 210) may have to access private network 250 via network device 220, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
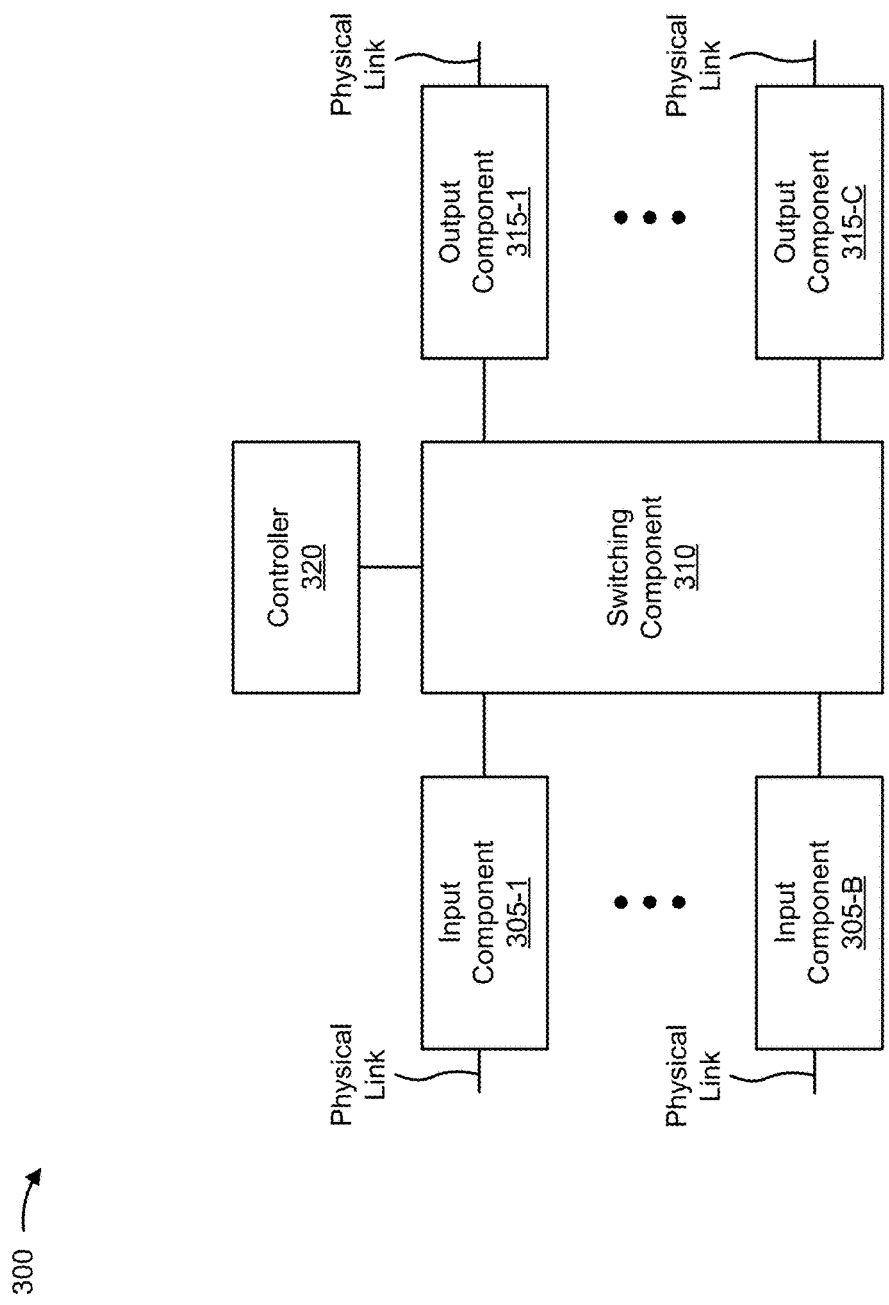
FIG. 3 is a diagram of example components of one or more devices of FIG. 2.

FIG. 3 is a diagram of example components of a device 300. Device 300 may correspond to client device 210, network device 220, and/or server device 230. In some implementations, client device 210, network device 220, and/or server device 230 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for establishing a connection to multiple network devices using a single IP address. In some implementations, one or more process blocks of FIG. 4 may be performed by network device 220. In some implementations, one or more process blocks of FIG. 4 may be performed by another device or a group of devices separate from or including network device 220, such as client device 210 and/or server device 230.

As shown in FIG. 4, process 400 may include receiving, by a network device, a request to establish a connection (block 410). For example, network device 220 may receive a request to establish a connection from client device 210. In some implementations, network device 220 may receive the request periodically, according to a schedule, based on input by a user of client device 210, and/or when client device 210 initiates a connection to network device 220 or a network with which network device 220 is associated. In some implementations, an element of network device 220 may receive the request. For example, a secure shell (SSH) daemon associated with network device 220 may receive the request.

In some implementations, the request may be associated with a protocol (e.g., secure shell (SSH) protocol, Internet protocol (IP), transport layer security (TLS) protocol, IP security (IPsec) protocol, transmission control protocol (TCP), etc.). In some implementations, the request may include a request to establish a connection to a network device. For example, the request may include a request to establish a connection, such as a secure connection via an unsecured network or a cloud computing session, to network device 220, a virtual network device (e.g., a VM or VNF of network device 220), and/or a peer network device of network device 220 (e.g., another network device 220).

In some implementations, the request may include a destination identifier that identifies a destination for the request. For example, the request may include a destination identifier that identifies one or more network devices (e.g., network device 220 and/or another network device, such as a peer network device 220, a VM of network device 220, etc.). Additionally, or alternatively, the request may include other information related to the request, network device 220, and/or another network device. For example, the request may include information that identifies a domain name and/or a hostname of network device 220 and/or another network device.

In some implementations, the destination identifier may have a particular format. For example, the destination identifier may include a hostname of network device 220, information that identifies a hostname or instance name of another network device (if any), and/or information that identifies a domain or domain name of a network device related to the request. As an illustrative example, a destination identifier may have the format of VM1.ND1.example.com, where "ND1" is the hostname of network device 220, "VM1" is the hostname of a VM executing on network device 220, and "example.com" is the domain name of network device 220 and/or VM1. In this way, network device 220 may determine information from the destination identifier based on the destination identifier having a particular format.

In some implementations, client device 210 and/or server device 230 may be configured to request to establish a connection. For example, client device 210 and/or server device 230 (e.g., a domain name server) may be configured with a set of destination identifiers and corresponding IP addresses (e.g., prior to client device 210 sending the request to establish the connection). In some implementations, the set of destination identifiers may be associated with a single IP address (e.g., an IP address of network device 220). For example, the set of destination identifiers may be associated with a single IP address when network device 220 is an intermediate network device between client device 210 and one or more other network devices (e.g., peer network devices 220, virtual network devices executing on network device 220, etc.). In this way, the quantity of IP addresses (e.g., IPv4 addresses) that are used to provide access and/or a connection to various network devices is reduced. This conserves network addressing resources when using the IP address to connect to multiple network devices, conserves memory resources when storing the IP addresses, and increases an efficiency of connecting to multiple network devices.

In some implementations, network device 220 may configure the set of destination identifiers on client device 210 and/or server device 230 (e.g., by providing information related to network device 220 and/or other network devices to client device 210 and/or server device 230). Additionally, or alternatively, client device 210 may configure the set of destination identifiers on client device 210 and/or server device 230 based on input by a user of client device 210. In some implementations, the set of destination identifiers and corresponding IP addresses may be used by client device 210 to provide the request to network device 220, by enabling client device 210 to send the request toward a particular network device.

In some implementations, network device 220 may configure operation of software and/or an application of network device 220. For example, network device 220 may configure operation of a pluggable authentication module (PAM) of network device 220. As another example, network device 220 may configure operations of an SSH daemon associated with network device 220. Continuing with the previous examples, network device 220 may configure a PAM and/or an SSH daemon of network device 220 to prevent network device 220 from authenticating a request when the request is to establish a connection with another network device (e.g., a virtual network device of network device 220 or a peer network device 220). In some implementations, network device 220 may use an identifier or a flag to indicate that network device 220 has a particular configuration (e.g., configured to avoid authentication of a request when the request is destined for another network device). The configuration of network device 220 is described in more detail below with respect to blocks 420-470.

In this way, network device 220 may receive a request from client device 210 to connect to one of multiple network devices associated with a single IP address.

As further shown in FIG. 4, process 400 may include determining whether the request is destined for the network device (block 420). For example, network device 220 may determine whether the request is destined for network device 220, a virtual network device implemented by network device 220, or another network device 220. In some implementations, network device 220 may determine whether the request is destined for network device 220 when network device 220 receives the request from client device 210.

In some implementations, network device 220 may determine whether the request is destined for network device 220 based on the destination identifier. For example, network device 220 may determine whether the destination identifier includes a hostname for a network device different from, or in addition to, a hostname for network device 220. Continuing with the previous example, network device 220 may further determine that the request is not destined for network device 220 (e.g., destined for a network device different from network device 220) when the destination identifier includes a hostname for a network device different from, or in addition to, a hostname for network device 220 (e.g., based on comparing information included in the destination identifier and information related to network device 220 and/or another network device). Conversely, and still continuing with the previous example, network device 220 may determine that the request is destined for network device 220 when the destination identifier lacks a hostname for another network device.

In this way, network device 220 may determine whether a received request is destined for network device 220 and/or another network device when network device 220 and/or another network device are associated with the same IP address.

As further shown in FIG. 4, if the request is not destined for the network device (block 420-NO), then process 400 may include determining, from a destination identifier, a device identifier that identifies a particular network device as a destination of the request (block 430) and determining whether the device identifier matches a set of device identifiers (block 440). For example, network device 220 may determine a hostname of a VM or a VNF executing on network device 220 from the destination identifier. As another example, network device 220 may determine a hostname of a network device different from network device 220 from a message that includes the destination identifier (e.g., a message received during an SSH handshake). In some implementations, an element (e.g., an SSH daemon) of network device 220 may determine the device identifier. In some implementations, network device 220 may be configured to determine the device identifier. For example, network device 220 may be configured to deviate from the normal operation of network device 220 to determine the device identifier.

In some implementations, network device 220 may determine whether network device 220 is configured to determine the device identifier (e.g., prior to determining the device identifier). For example, network device 220 may determine whether network device 220 is configured to determine the device identifier based on a configuration identifier or flag that identifies a particular configuration of network device 220. Further, network device 220 may determine that network device 220 is configured to determine the device identifier based on having the configuration identifier or flag. Conversely, network device 220 may determine that network device 220 is not configured to determine the device identifier based on lacking the configuration identifier or flag. In some implementations, when network device 220 is not configured to determine the device identifier, network device 220 may not forward the request to the destination network device, thereby permitting network device 220 to dynamically handle requests. This conserves processing resources that would otherwise be used to determine a manner in which to process a device identifier by reducing or eliminating the need for network device 220 to forward the request.

In some implementations, network device 220 may determine whether the device identifier matches a set of device identifiers stored by network device 220. For example, network device 220 may determine whether the device identifier matches the set of device identifiers to verify that the device identifier matches a known or registered network device. In some implementations, network device 220 may use a data structure to determine whether the device identifier matches a set of device identifiers. For example, network device 220 may perform a lookup of the device identifier in a data structure that includes a set of device identifiers for known or trusted network devices, thereby increasing security when establishing a connection between client device 210 and a network device.

In some implementations, the set of device identifiers may be stored by a device other than network device 220. For example, the set of device identifiers may be stored by a domain name system (DNS) server, a lightweight directory access protocol (LDAP) server, and/or a network information system (NIS) server. This conserves memory resources of network device 220 by reducing or eliminating a need for network device 220 to store the set of device identifiers.

In this way, network device 220 may verify the destination of the request, thereby increasing security of a connection between devices. In addition, having a particular network device 220 handle connection requests for other network devices 220 connected to private network 250 further increases security. For example, having a particular network device 220 verify connection requests destined for other network devices 220 connected to private network 250 may reduce or eliminate denial-of-service attacks by configuring the particular network device 220 to withstand such attacks and to drop/deny malicious connection requests (e.g., via the use of software or an application). This conserves processing resources of other network devices 220 by reducing or eliminating the need for the other network devices 220 to evaluate connection requests and conserves network resources by preventing a malicious request from being forwarded to the other network devices 220. In addition, use of a particular network device 220 in this way may permit quick and efficient gathering and analysis of metrics related to received connection requests, thereby conserving processing resources and increasing efficiency.

As further shown in FIG. 4, process 400 may include providing the request to the network device based on determining that the device identifier matches the set of device identifiers (block 450). For example, network device 220 may forward the request to a virtual network device (e.g., executing on network device 220) or a peer network device 220 based on determining that the device identifier matches the set of device identifiers. In some implementations, network device 220 may forward the request to the network device so that the network device may perform an action related to the request (e.g., authenticate the request, deny the request, accept the request, etc.).

In some implementations, network device 220 may perform an action related to establishing a connection between client device 210 and a destination network device 220 (e.g., providing the request to the destination network device 220, establishing a tunnel between client device 210 and the destination network device 220, etc.). In some implementations, network device 220 may provide the request without authenticating the request. For example, network device 220 may forward the request, and any credentials received from client device 210, to the destination network device without authenticating the request, thereby conserving processing resources by reducing or eliminating multiple authentications of the request and by preventing network device 220 from authenticating the request. In addition, providing the request without authenticating the request may increase an efficiency of authenticating the request by having the destination network device authenticate the request (e.g., rather than having an intermediate network device authenticate the request).

In some implementations, network device 220 may be configured to prevent authentication of the request (e.g., prior to receiving the request). For example, an SSH daemon of network device 220 may be configured to deviate from the normal operation of the SSH daemon to prevent authentication of the request. In other words, providing the request without authenticating the request may not be included in the normal operation of network device 220.

In this way, network device 220 may quickly and efficiently provide the request to a network device associated with the same IP address as network device 220.

As further shown in FIG. 4, process 400 may include performing an action related to the request and/or the connection (block 460). In some implementations, when performing the action, network device 220 may establish a connection between network device 220 and the network device. For example, an SSH daemon of network device 220 may establish a connection between network device 220 and a peer network device 220, a VM of network device 220, and/or a VNF of network device 220 using credentials (e.g., a public-private key pair, a username and password, or a security certificate) received from client device 210. In this way, network device 220 may facilitate communications between client device 210 and network device 220 and/or another network device.

In some implementations, network device 220 may be configured to establish the connection in the manner described above. For example, a PAM of network device 220 may be configured to permit network device 220 to establish the connection to a VM of network device 220, a VNF of network device 220, and/or another network device using the same credentials received from client device 210. In some implementations, network device 220 may be configured to deviate from the normal operation of network device 220 to establish the connection between network device 220, a virtual network device implemented on network device 220, and/or another network device 220, thereby enabling network device 220 to forward traffic (e.g., packets) between client device 210 and the network device.

In some implementations, when performing the action, network device 220 may forward (e.g., relay) traffic between client device 210 and the network device. For example, an SSH daemon associated with network device 220 may exchange traffic between client device 210 and a VM executing on network device 220 using a first connection between client device 210 and network device 220 and a second connection between network device 220 and the VM of network device 220. In this way, network device 220 may facilitate communications between client device 210, network device 220, and/or another network device.

In some implementations, when performing the action, network device 220 may terminate a connection. For example, an SSH daemon associated with network device 220 may terminate a connection between client device 210 and network device 220 and/or a connection between network device 220 and another network device, such as when a connection times out after a threshold amount of time, based on user input, and/or the like. This conserves processing resources and/or network resources related to maintaining a connection between devices.

In this way, network device 220 may perform an action related to the request and/or the connection.

As further shown in FIG. 4, if the request is destined for the network device (block 420-YES), then process 400 may include performing an action related to the request and/or the connection (block 470). For example, network device 220 may perform an action related to the request to establish a connection with network device 220 and/or the connection established between client device 210 and network device 220.

In some implementations, when performing the action, network device 220 may accept the request and establish a connection between client device 210 and network device 220. For example, network device 220 may establish an SSH connection between client device 210 and an SSH daemon of network device 220. This facilitates communications between client device 210 and network device 220. In some implementations, when performing the action, network device 220 may reject the request, thereby preventing a connection from being established between client device 210 and network device 220. In some implementations, when network device 220 accepts or rejects a request, network device 220 may provide a message (e.g., for display) to client device 210, a user device of a network administrator, and/or the like.

In some implementations, when performing the action, network device 220 may send and/or receive traffic via the connection, thereby facilitating communications between client device 210 and network device 220. As another example, network device 220 may terminate a connection (e.g., based on a connection timing out after a threshold amount of time of inactivity, user input, etc.), thereby conserving processing resources and/or network resources related to maintaining a connection between network devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations, described herein, enable the use of a single IP address to provide access to multiple network devices. As such, the implementations described herein, reduce or eliminate the need to have a different IP address for each network device. Additionally, implementations, described herein, reduce a total quantity of IP addresses used to provide access to multiple network devices. This conserves memory resources related to storing IP addresses by storing fewer IP addresses. In addition, this conserves processing resources related to retrieving the IP addresses from memory by reducing a quantity of lookups a device may have to perform to retrieve the IP addresses from memory. Further, this improves an efficiency of connecting to multiple network devices via use of a single IP address rather than multiple IP addresses.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive a request to establish a connection,
      the request being destined for the device or one or more other devices,
      the device and the one or more other devices being associated with a single Internet protocol (IP) address,
      the request including a destination identifier that identifies a destination to which the request is to be provided;
   determine that the destination identifier includes a first device identifier that identifies the device and a second device identifier that identifies a second device of the one or more other devices;
   identify the second device as the destination to which the request is to be provided based on determining that the destination identifier includes the first device identifier and the second device identifier;
   determine whether the first device identifier or second device identifier matches an identifier included in a set of device identifiers stored by the device to verify the first device identifier or second device identifier;
   provide the request to the second device based on verifying the first device identifier or second device identifier; and
   perform an action related to the request or the connection based on providing the request to the second device.

2. The device of claim 1, where:
   the device includes a daemon used to receive the request, and
   where the one or more processors, when receiving the request, are to:
   receive the request using the daemon.

3. The device of claim 1, where the one or more processors are further to:
   prevent the device from authenticating the request by configuring a pluggable authentication module (PAM) of the device; and
   where the one or more processors, when providing the request to the second device, are to:
   provide the request to the second device without authenticating the request based on a configuration of the PAM of the device.

4. The device of claim 1, where the one or more processors are further to:
   prevent the device from authenticating the request by configuring a daemon of the device; and
   where the one or more processors, when providing the request to the second device, are to:
   provide the request to the second device without authenticating the request based on a configuration of the daemon of the device.

5. The device of claim 1, where the one or more processors are further to:
   determine that the first device identifier is different than the second device identifier; and
   where the one or more processors, when identifying the second device as the destination to which the request is to be provided, are to:
   determine that the first device identifier is different than the second device identifier.

6. The device of claim 1, where the destination identifier includes:
   information identifying a domain name,
   information identifying a hostname, or
   information identifying both the domain name and the hostname.

7. The device of claim 1, where the one or more processors are further to:
   provide a set of credentials to the second device after determining that the second device identifier identifies the second device,
      the set of credentials being provided without authenticating the set of credentials; and
   where the one or more processors, when providing the request to the second device, are to:
   provide the request to the second device to permit the second device to authenticate the request based on providing the set of credentials to the second device.

8. A non-transitory computer-readable medium storing instructions, the instructions comprising:
   one or more instructions that, when executed by one or more processors, cause the one or more processors to:

receive a request to establish a connection to a network device or one or more other network devices,
the request including a destination identifier that identifies a destination to which the request is to be provided,
the one or more other network devices being associated with a same Internet protocol (IP) address as the network device;
provide a set of instructions to a daemon of the network device to permit the daemon to determine a device identifier,
the set of instructions indicating a format of the destination identifier or the device identifier;
determine, from the destination identifier and using the set of instructions and based on providing the set of instructions to the daemon of the network device, the device identifier that identifies the network device or another network device of the one or more other network devices as the destination to which the request is to be provided based on receiving the request;
determine whether the device identifier matches a set of stored device identifiers,
the set of stored device identifiers identifying a set of verified network devices;
provide the request to the network device or the other network device based on determining that the device identifier matches the set of stored device identifiers; and
perform an action related to the request or the connection based on providing the request to the network device or the other network device.

9. The non-transitory computer-readable medium of claim 8, where the one or more instructions, when executed by the one or more processors, further cause the one or more processors to:
provide, to the other network device, a set of destination identifiers to permit the other network device to request to establish the connection,
the set of destination identifiers being associated with the set of verified network devices; and
where the one or more instructions, that cause the one or more processors to receive the request, cause the one or more processors to:
receive the request based on providing the set of destination identifiers to the other network device.

10. The non-transitory computer-readable medium of claim 8, where the one or more instructions, when executed by the one or more processors, further cause the one or more processors to:
prevent authentication of the request by the network device based on receiving the request; and
where the one or more instructions, that cause the one or more processors to provide the request to the network device or the other network device, cause the one or more processors to:
provide the request to the network device or the other network device based on preventing authentication of the request.

11. The non-transitory computer-readable medium of claim 8, where the one or more instructions, when executed by the one or more processors, further cause the one or more processors to:
determine that the destination identifier includes a first device identifier and a second device identifier,
the first device identifier being associated with the network device that received the request,
the second device identifier being associated with the other network device; and
identify the other network device as the destination to which the request is to be provided based on determining that the destination identifier includes the first device identifier and the second device identifier.

12. The non-transitory computer-readable medium of claim 8, where the one or more instructions, when executed by the one or more processors, further cause the one or more processors to:
determine whether the network device can determine the device identifier; and
where the one or more instructions, that cause the one or more processors to determine the device identifier, further cause the one or more processors to:
determine the device identifier based on determining whether the network device can determine the device identifier.

13. The non-transitory computer-readable medium of claim 12, where the other network device includes:
a virtual machine implemented on the network device, or
a virtual network function implemented on the network device.

14. A method, comprising:
providing, by a device and to a second network device, a set of destination identifiers to permit the second network device to request to establish a connection with a first network device,
the set of destination identifiers being associated with a set of verified network devices;
receiving, by the device and based on providing the set of destination identifiers to the second network device, a request to establish the connection to the first network device or one or more other network devices,
the request including a destination identifier that identifies a destination to which the request is to be provided,
the one or more other network devices being associated with a same Internet protocol (IP) address as the first network device;
determining, by the device and from the destination identifier, a device identifier that identifies the first network device or another network device of the one or more other network devices as the destination to which the request is to be provided based on receiving the request;
determining, by the device, whether the device identifier matches a set of stored device identifiers,
the set of stored device identifiers identifying the set of verified network devices;
providing, by the device, the request to the first network device or the other network device based on determining that the device identifier matches the set of stored device identifiers; and
performing, by the device, an action related to the request or the connection based on providing the request to the first network device or the other network device.

15. The method of claim 14, further comprising:
identifying a configuration identifier that indicates that the device is prevented from authenticating the request when the request is associated with establishing the connection to the first network device; and
where providing the request to the first network device or the other network device comprises:
providing the request to the first network device based on identifying the configuration identifier.

16. The method of claim 14, further comprising:
determining whether the request is destined for the first network device or the other network device based on determining that the destination identifier includes multiple device identifiers.

17. The method of claim 14, further comprising:
establishing the connection between the device and the first network device based on determining the device identifier;
providing a set of credentials to the first network device to permit the first network device to authenticate the request based on establishing the connection,
the set of credentials having been received from another device requesting to establish the connection; and
where providing the request to the first network device comprises:
providing the request to the first network device based on providing the set of credentials to the first network device.

18. The method of claim 14, further comprising:
determining that another device identifier is associated with the device and not with the first network device using a set of instructions based on determining the other device identifier,
the set of instructions indicating a format of another destination identifier that includes the other device identifier; and
performing another action based on determining that the other device identifier is associated with the device and not with the first network device.

19. The method of claim 14, further comprising:
identifying a configuration identifier that identifies a configuration of the device;
determining whether the device can determine the device identifier based on the configuration identifier; and
where determining the device identifier comprises:
determining the device identifier based on determining whether the device can determine the device identifier.

20. The non-transitory computer-readable medium of claim 8, where the one or more instructions, that cause the one or more processors to perform the action related to the request or the connection, cause the one or more processors to:
establish, using the daemon of the network device, a connection between the network device and the other network device.

* * * * *